United States Patent [19]

Span et al.

[11] Patent Number: 4,511,275
[45] Date of Patent: Apr. 16, 1985

[54] CLAMPING MECHANISM

[75] Inventors: Francis J. Span; Aloysius T. M. Boland; Albertus J. A. J. van Laarhoven, all of Eindhoven, Netherlands

[73] Assignee: U.S. Philips Corporation, New York, N.Y.

[21] Appl. No.: 380,167

[22] Filed: May 20, 1982

[30] Foreign Application Priority Data

May 21, 1981 [NL] Netherlands ......................... 8102498

[51] Int. Cl.³ .......................... F16C 11/00; F16D 1/12; F16D 3/00
[52] U.S. Cl. ..................................... 403/33; 403/349; 403/330
[58] Field of Search ............. 24/221 R, 248 B, 252 B, 24/252 R, 250; 354/286; 403/349, 33, 18, 321, 330, 348; 292/304; 285/312

[56] References Cited

U.S. PATENT DOCUMENTS

| 2,561,279 | 7/1951 | Holt | 403/349 |
| 2,793,902 | 5/1957 | Govan, Jr. | 403/349 |
| 3,070,391 | 12/1962 | Hofmann | 403/349 |
| 3,643,906 | 2/1972 | Werner | 24/221 |
| 4,079,257 | 3/1978 | Jatteau et al. | 250/363 |
| 4,217,064 | 8/1980 | Hogan | 403/33 |

Primary Examiner—Mickey Yu
Attorney, Agent, or Firm—Marc D. Schechter

[57] ABSTRACT

In an apparatus having a comparatively heavy exchangeable element there is provided a clamping device for the element with a bayonet coupling and with grips which can be folded down only after the bayonet coupling has been brought into an engaged position. When the grips are folded down, a spring is activated so that a locked clamping coupling is obtained.

5 Claims, 5 Drawing Figures

CLAMPING MECHANISM

BACKGROUND OF THE INVENTION

The invention relates to an apparatus comprising a clamping mechanism for coupling an exchangeable element to the apparatus in a predetermined angular orientation.

The invention is particularly applicable to an exchangeable element which is comparatively heavy and which must be coupled to the apparatus, for example, by manual manipulation. In such a case it is often advantageous if first a comparatively loose connection can be made between the apparatus and the exchangeable element, so that the element at least cannot fall off. To this end, the coupling mechanism often comprises a bayonet coupling. A slight rotation of the element with respect to the apparatus is usually sufficient to establish the loose connection.

Known apparatus often comprise a clamping mechanism with a clamping force which acts against the rotation, and the element is assumed to be adequately secured in the correct position thereby. This arrangement has several drawbacks. For example, a comparatively large torque is exerted on the apparatus, there usually is no certainty that the elements has been rotated far enough, and the element could shake loose during operation and even fall off the apparatus. A snap-type clamping mechanism which is activated after sufficient rotation of the element can prevent the element from shaking loose, but such a mechanism does not prevent excessive torques and does not always ensure with certainty that the element has been rotated far enough. Similar undesirable torques occur again, of course, when the element is removed.

It is an object of the invention to provide a clamping mechanism which assures correct positioning of the exchangeable element, which assures that the exchangeable element will not fall off, and which avoids the application of excess torques. According to the invention the clamping mechanism comprises at least one folding hand grip which can be folded down to lock the clamping mechanism with spring pressure only when the element has a predetermined orientation with respect to the apparatus.

With this clamping mechanism it is not necessary to exert a large torque, because the element may remain comparatively loosely attached to the apparatus until the coupling is engaged. The risk of the element not being rotated far enough is thus substantially reduced. When the clamping mechanism is provided with means which allow the hand grip to be folded down only in the engaged position of, for example, a bayonet coupling, insufficient rotation is fully precluded and the correct orientation of the hand grips can be visually checked. For example, by releasing a spring force in the bayonet coupling when the grip is folded down, a clamping coupling is obtained in the correct position.

The hand grip in a preferred embodiment of the invention comprises at least one preferably slightly conical guide pin or bore, and the apparatus comprises a matching bore or guide pin. The clamping effect is produced in a preferred embodiment by a leaf spring which is secured to the apparatus and which ensures that the coupling clamps firmly when the hand grip is folded down.

The clamping mechanism of a preferred embodiment of the invention comprises two symmetrically arranged folding hand grips which lie in planes extending transverse a coupling surface of the apparatus in the unfolded or erected position. The hand grips lie in planes parallel to coupling surface in the folded position.

The element can be coupled in two axial orientations in a further preferred embodiment because each of the grips has a symmetrical construction. This embodiment is attractive, for example, for coupling a collimator to a gamma camera. Such collimators are sometimes of a focussing type, which means that the channels of the collimator are all directed onto one point or line. The coupling mechanism enables such a collimator to be fitted so that it has either a converging or a diverging effect.

DESCRIPTION OF THE PREFERRED EMBODIMENTS

Figure 1A:
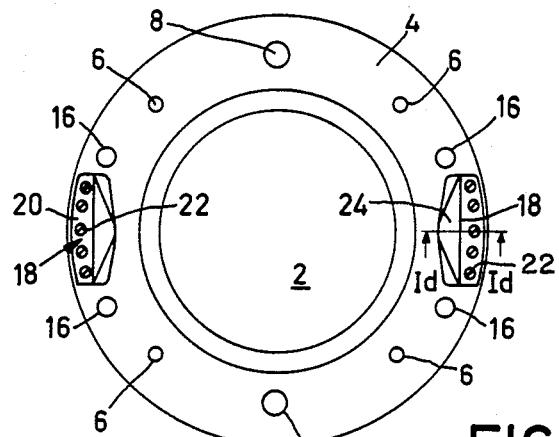
FIGS. 1a and 1b are plan views of a clamping device for an apparatus according to the invention.
Figure 1C:
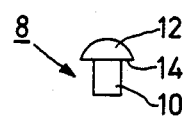
FIG. 1c is a side view of a pin used in a clamping device according to the invention.

FIG. 1a shows a clamping device according to the invention which comprises an opening 2, for example, for admitting radiation to be measured into the apparatus or for the passage of radiation to be generated inside the apparatus, an annular coupling plate 4 with guides 6, and two pins 8 whose profile is shown in FIG. 1c pins 8 each comprise a cylindrical portion 10 and a head 12 with an abutment face 14. The coupling plate 4 further comprises four bores 16 and two leaf springs 18. A flat section 20 of each spring 18 is secured to the coupling plate 4 by means of screws 22. A resilient portion 24 of the spring 18 extends obliquely from the coupling plate 4. (FIG. 1d.)

A second coupling plate coupling ring 30 (shown in FIG. 1b) which is to be secured to the coupling plate 4 comprises an opening 32 in which, for example, a diaphragm, a collimeter or some other similar element can be mounted, coupling ring 30 also comprises two keyhole slots 34, which are adapted to the dimensions of the pins 8 to form therewith a bayonet coupling, and two folding hand grips 36. The grips 36 are pivotable about axes 38 and comprise openings 40 to receive the operator's hands, and cams 42, which in operation cooperate with the bores 16 in coupling plate 4. When the ring 30 is being transported, the grips 36 lie in planes which extend transverse to the plane of the ring 30. For coupling the ring 30 to the coupling plate 4 the ring 30 is connected to the coupling plate 4 by means of the bayonet coupling (keyhold slots 34 and pins 8), and is rotated to the stop position shown. The ring 30, with an element mounted therein, is then suspended from the apparatus but can still be readily moved. Portions 44 of the ring 30 assume a clamping position against the abutment faces 14 of the pins 8 only when the grips 36 are folded down, thus effecting the coupling. The ring 30 can be simply removed again by pivoting the grips 36.

Figure 1B:
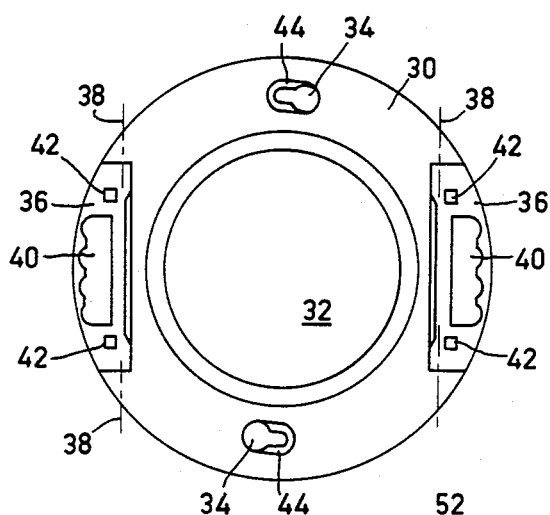
Figure 1D:
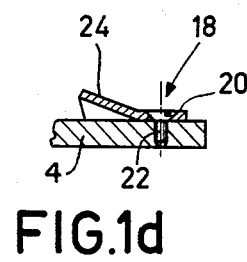
FIG. 1d is a cross-sectional view of a leaf spring used in a clamping device according to the invention.

As is shown in FIG. 1b, the grips 36 preferably comprise cams 42 on the lower side as well as on the upper side of the grips 36. Moreover, preferably grips 36 can be pivoted out of the plane of the ring 30 to either side. The hand grips 36 preferably drop into the folded position with a strong (in the plane of the ring 30) snap action, or they can be locked into this position.

Figure 2:
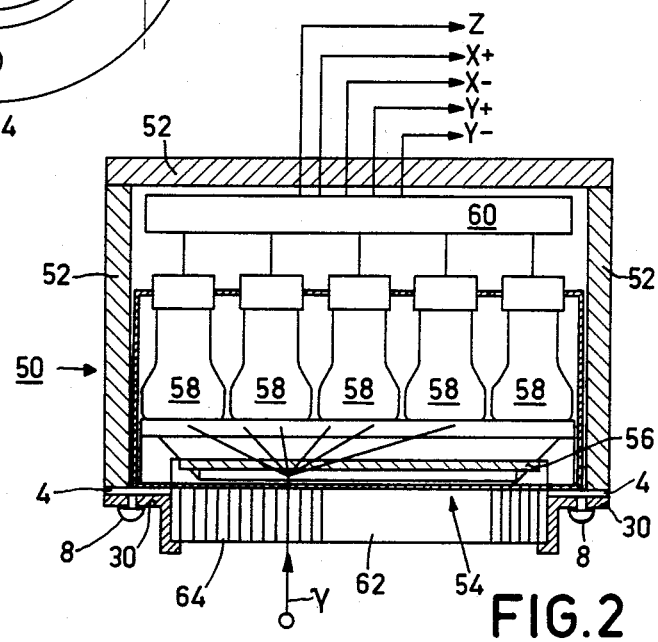
FIG. 2 is a partly schematic, partly cross-sectional view of an apparatus in accordance with the invention in the form of a gamma camera.

A gamma camera as shown in FIG. 2 comprises a housing 50 with comparatively thick radiation walls 52 and an entrance opening 54 for admitting gamma quanta to be measured to a scintillation crystal 56. The housing 50 accommodates a matrix of photomuliplier tubes 58 and a first signal processing device 60. A gamma camera of this kind is described, for example, in U.S. Pat. No. 4,079,257, and is used for the localized measurement of gamma quanta to be emitted by a patient.

In order to permit localization of the gamma quanta sources in the body to be examined, a camera of this kind is equipped with a collimator 62. Such a collimator, actually consisting of a block of lead comprising numerous channels 64, is comparatively heavy (for example, 10 kg), and must be capable of being easily positioned and coupled to the gamma camera.

Usually different types of collimators are used for different types of examinations. According to the invention, the housing 50 comprises a coupling plate 4 with pins 8 and springs 18 (not shown in FIG. 2). The collimator is accommodated in a coupling ring 30 of the construction described above. The hand grips of the coupling ring, which are not visible in FIG. 2, are oriented in the direction of the channels 64 in the noncoupled position, so that the collimator can be easily carried. Also, it is possible to visually verify whether the grips are folded down or not, and hence whether or not the collimator has been secured and locked.

Similar, comparatively heavy elements which have to be exchanged by hand are, for example, diaphragms for radiation apparatus, scatter grids are, for example, X-ray diagnostic apparatus, adaptation lenses for large optical systems, and valves.

What is claimed is:

1. A clamping mechanism for exchangeably coupling two elements together in a preselected angular orientation, said clamping mechanism comprising:
   a first coupling plate attached to one element;
   a second coupling plate attached to the other element;
   means for loosely coupling the first and second coupling plates to each other, said loose coupling means forming a tight coupling when the coupling plates are pressed away from each other; and
   means for pressing the coupling plates away from each other, said pressing means being operable only when the coupling plates are positioned at the preselected angular orientation;
   wherein the pressing means comprises:
   a spring attached to the first coupling plate, said spring being biased to oppose any force compressing the spring toward the first coupling plate; and
   a folding hand grip attached to the second coupling plate, said hand grip being pivotable through a plane of the second coupling plate;
   wherein, when the coupling plates are loosely coupled in their preselected angular orientation and the hand grip is pivoted into the plane of the second coupling plate, the hand grip bears on the spring and compresses it toward the first coupling plate.

2. A clamping mechanism as claimed in claim 1, characterized in that the pressing means further comprises:
   a cam, attached to the hand grip; and
   a bore in the first coupling plate, the cam fitting within the bore only when the coupling plates are tightly coupled in their preselected angular orientation.

3. A clamping mechanism as claimed in claim 2, characterized in that the loose coupling means comprises:
   at least two pins, attached to one coupling plate, each of said pins having a cylindrical portion with an expanded head, said head having a flat abutment face directed toward the coupling plate;
   at least two keyhole slots in the other coupling plate, said slots having wide portions through which the pin heads can pass and narrow portions for engaging an abutment face of a pin head, said keyhole slots arranged opposite the pins when the coupling plates are substantially at their preselected angular orientation.

4. A clamping mechanism as claimed in claim 3, characterized in that:
   there are two folding hand grips attached to the second coupling plate; and
   each hand grip has a symmetrical construction and can be pivoted to either side of the plate.

5. A clamping mechanism as claimed in claim 4, characterized in that the spring is a leaf spring.

* * * * *